July 23, 1963

G. DE BOER 3,098,297

CHEESE MOLD ASSEMBLY

Filed Nov. 2, 1959

INVENTOR

Geert De Boer

BY
Stevens, Davis, Miller + Mosher
ATTORNEYS

July 23, 1963

G. DE BOER 3,098,297

CHEESE MOLD ASSEMBLY

Filed Nov. 2, 1959

INVENTOR

Geert De Boer

BY
Stevens, Davis, Miller + Mosher
ATTORNEYS 3,098,297
CHEESE MOLD ASSEMBLY
Geert de Boer, Lippenhuizen, Netherlands, assignor to N.V. Volma, Gorredijk, Netherlands, a corporation of the Netherlands
Filed Nov. 2, 1959, Ser. No. 850,380
Claims priority, application Netherlands Nov. 19, 1958
7 Claims. (Cl. 31—44)

The invention relates to a process for automatically filling cheese moulds with metered quantities of curd in non-fluid condition, a mass consisting of whey and curd being fed into a sieve cylinder for removing the whey, and the curd after complete or partial removal of the whey being pre-compressed and finally pressed into a cheese mould.

According to a known method the removal of the whey takes place in a rotary sieve and the curd is fed from the sieve to pre-compression moulds. The removal of whey and the pre-compression of the curd accordingly take place in two separate stages. According to another known method the removal of whey takes place in a vertical sieve cylinder describing a predetermined path and the curd is fed from the sieve cylinder to cheese moulds, in which it is pre-compressed. According to this method too the removal of whey and the pre-compression of the curd therefore take place in two separate stages. Since the cooling of the curd has to be avoided as much as possible, it is important to keep the number of stages of the process as small as possible.

According to the invention this is attained in that the mass consisting of curd and whey is fed directly from the cheese vat or, if several cheese vats are present, from a collecting tank in metered quantities to the sieve cylinder, the removal of whey from the mass taking place exclusively in the sieve cylinder, and the pre-compression also taking place in the sieve cylinder.

After having passed through a metering device, the mass consisting of curd and whey can be fed into the upper part of the sieve cylinder by gravity. According to a further feature of the invention, however, the sieve cylinder itself is at the same time used as a metering device, the sieve cylinder being furnished with a metering and compressing plunger and being filled with the mass through its open lower end against a light pressure of the plunger, the mass forcing the plunger upwards and the plunger automatically shutting off the supply of the mass after a given stroke; subsequently the plunger is pushed down with sufficient force to pre-compress the mass in the sieve cylinder, and finally the pre-compressed mass is pressed by this plunger into a cheese mould placed underneath the sieve cylinder.

Owing to the fact that during the filling of the sieve cylinder the whey already flows off through the perforations of the sieve cylinder the quantity of curd fed to the sieve cylinder will always be practically the same at the moment the plunger shuts off the supply of the mass, so that correct metering will take place even if the curd content of the mass fluctuates. Further the mass present in the sieve cylinder is permanently shut off from the atmosphere, which is desirable to ensure a high quality of the cheese.

An apparatus for carrying out the above mentioned process is characterized according to the invention by at least one vertical sieve cylinder, the lower end of which is open, and which contains a metering and compressing plunger provided with a mechanism for the exertion of a controllable upward or downward force, while the lower end of the sieve cylinder can be closed by a slideway that can be moved relative to the sieve cylinder, which slideway is furnished with an inlet opening that can be closed by a valve and with a conduit for the mass consisting of curd and whey, which is connected to the lower end of it, as well as with an outlet opening, underneath which a cheese mould can be placed; and by a mechanism which closes the inlet valve automatically when the plunger during its upward stroke reaches a given position.

The valve for closing the inlet opening consists suitably of a disk in the form of a truncated cone, the upper face of which in the closed position is flush with the top of the slideway and the lower face of which is fitted with an actuating rod.

The invention is elucidated more fully below with reference to the annexed drawing.

Figure 1:
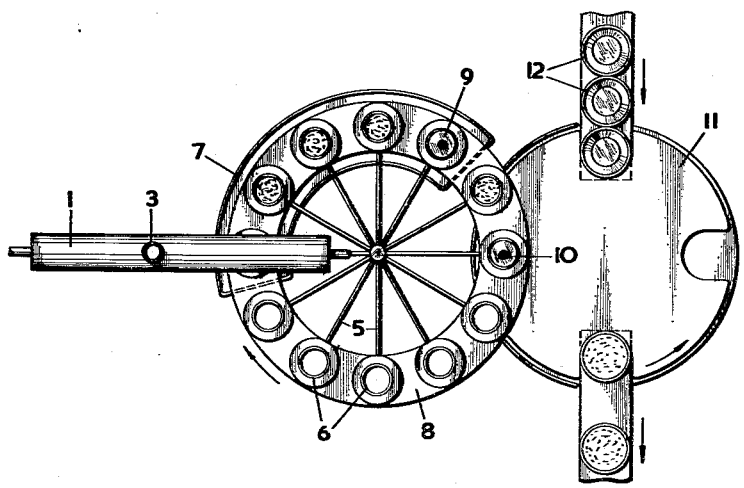
FIGURE 1 shows a plan of an apparatus for carrying out the process according to the invention.

In the cylinder 1 (FIGURE 2) a double plunger 2 is adapted to reciprocate. The cylinder 1 is furnished with an inlet opening 3 and an outlet opening 4. On a turnstile 5 are secured some sieve cylinders, and one of these sieve cylinders 6 is located underneath the outlet opening 4 in the position of the drawing. Underneath the turnstile a gutter 7 is present for collecting whey flowing from the sieve cylinders. As the turnstile 5 revolves the sieve cylinders slide over a stationary slideway 8. The whey can be expelled to the last drop from the mass of curd present in the sieve cylinders by a plunger 9. A plunger 10 has been provided to press the curd from the sieve cylinder into a cheese mould. The cheese moulds 12 are arranged in a turntable 11, which is driven by the turnstile 5 and is arranged in such a way that each time a cheese mould 12 arrives beneath the sieve cylinder arriving underneath the plunger 10.

The apparatus described above operates as follows:

The mass consisting of whey and curd, which comes from the cheese vat, or, if several cheese vats are present, from a collecting tank, while being stirred vigorously flows into the space between the two halves of the double plunger 2 whenever the double plunger 2 clears the inlet opening 3, and fills this space completely. By increasing or decreasing the distance between the two halves of the plunger (for which purpose one half of the double plunger, for instance, may be fitted with screw thread on the plunger rod) one can adjust the quantity of the mass that is delivered.

When the double plunger has moved to its other extreme position, the inlet opening is closed and the metered quantity flows through the outlet opening 4 into the sieve cylinder 6 without a bottom, which is moved stepwise over the slideway 8 by the turnstile 5. In this process the whey leaks out above the whey gutter 7, which is promoted by the pressure of the plunger 9, if desired. The slideway 8 then forms the bottom of the sieve cylinder.

An opening has been provided in the slideway 8, over the cheese mould 12 to be filled and when a sieve cylinder 6 has arrived over this opening, the plunger 10 forces the curd out of the sieve cylinder and compresses the curd firmly in the cheese mould. The turn table 11 is fitted with an arresting mechanism for exactly positioning the successive cheese moulds 12 underneath the opening.

In general the sieve cylinders 6 are furnished with perforations over the whole of their height, but the lower part may be unperforated, if desired.

Figure 2:
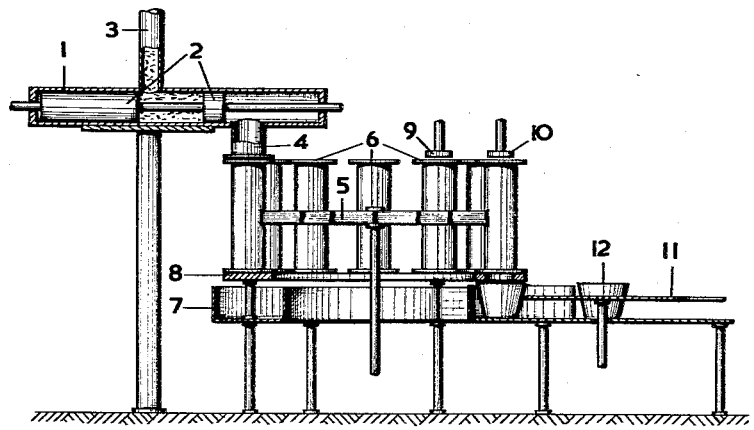
FIGURE 2 shows a vertical cross-section through the apparatus according to FIGURE 1.
Figure 3:
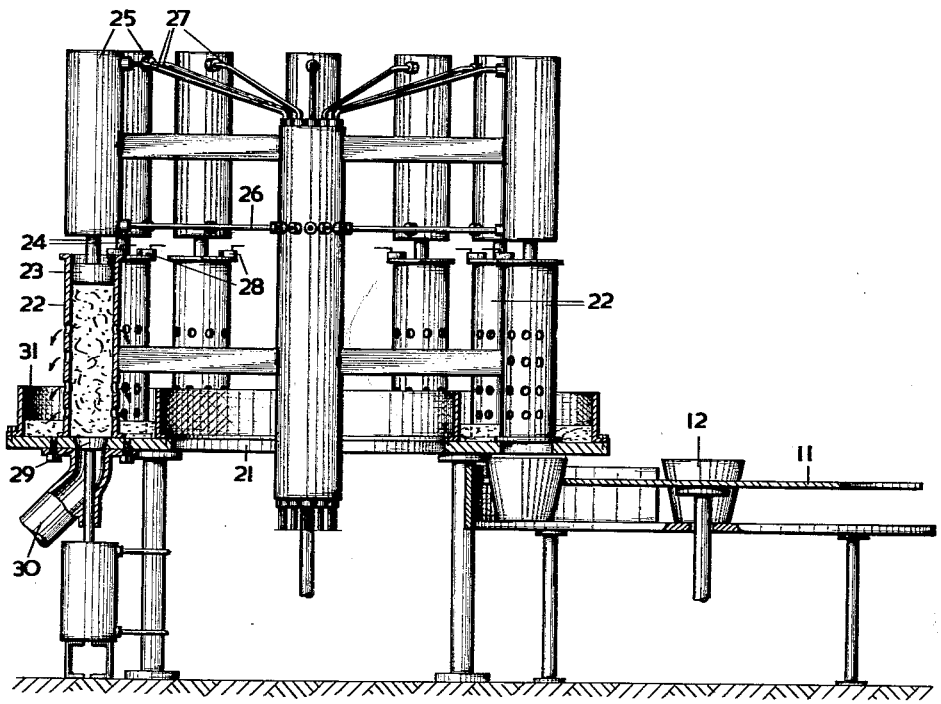
FIGURE 3 shows a partial vertical cross-section through a modified form of the apparatus, in which the sieve cylinder is filled from beneath and serves at the same time for metering.

In the embodiment according to FIGURE 3 a separate metering device is superfluous, because this is formed by the sieve cylinder itself. In this embodiment a stationary slideway 21 supports a number of sieve cylinders 22, which can be moved stepwise in a circular path over the slideway 21, similar to the arrangement in FIGURES 1 and 2. Each sieve cylinder 22 contains a plunger 23, which can be moved up and down by means of a compressed-air cylinder 25 which contains a plunger connected with the plunger rod 24. The cylinder 25 moves with the sieve cylinder 22 in a circular path over the slideway 21. The compressed-air conduits 26 and 27 have been placed along the driving arm (not shown) of the sieve cylinders. At the upper end of the sieve cylinder 22 an electric switch 28 has been fitted, which is operated by the plunger 24 when it has reached its highest position.

In the slideway 21 an inlet opening is present, which can be closed by means of a disk-shaped valve 29, which is to be operated pneumatically. A supply conduit 30 for the mass consisting of curd and whey is connected on the lower side of the slideway with the inlet opening. When the valve is closed, the upper face of the valve is preferably flush with the top of the slideway. On the slideway 21 a gutter 31 for collecting whey flowing out through the perforations of the sieve cylinders has been fitted.

When a sieve cylinder 22 has to be filled, it is moved over the inlet opening while its plunger 23 is in the lower part of the sieve cylinder. The valve 29 is lifted, so that the mass consisting of curd and whey enters the sieve cylinder 22 from beneath. The plunger 23 is thus forced up. In order to keep the back pressure as low as possible, one can supply via the conduit 26 compressed air under such a pressure that the weight of the plunger 23, the plunger rod 24, and the operating plunger is neutralized completely or almost completely and the plunger 23 virtually floats in the sieve cylinder 22. When the plunger 23 reaches its highest position, it actuates the switch 28, as a result of which the valve 29 is closed automatically. Subsequently all the sieve cylinders 22 are moved one step further, in consequence of which the next sieve cylinder arrives over the inlet opening and can be filled. If, when the valve is closed, its upper face is flush with the top of the slideway, it is ensured that when the previously filled sieve cylinder is moved away, no layer of the mass of curd and whey is left behind on the upper face of the valve.

The lower end of the filled sieve cylinder 22 continues to be shut off by the slideway 21 until, after a number of steps, the cylinder arrives over an outlet opening (not shown) in the slideway 21, underneath which a cheese mould is placed, similar to the arrangement in FIGURES 1 and 2. During the stepwise progress between the inlet opening and the outlet opening the greater part of the whey can flow off from the sieve cylinder, while the plunger 23 moves down in the sieve cylinder 22 by its own weight. Subsequently the mass is precompressed in the sieve cylinder 22 by the feeding of compressed air under a relatively high pressure through the conduit 27. When the outlet opening in the slideway has been reached, the plunger 23 forces the precompressed mass of curd into the cheese mould. The emptied sieve cylinder after one or more steps arrives over the inlet opening again, and the cycle described above is repeated.

It is also conceivable for the sieve cylinders 22 with their pneumatic operating cylinders 25 to be stationary and for the slideway 21 with its supply conduit 30 and its valve 29 to be rotatable, so that the inlet opening is brought in turn underneath each of the sieve cylinders. It is only essential that the sieve cylinders and the slideway can be moved relative to each other.

What I claim is:

1. Apparatus for automatically filling cheese molds with metered quantities of curd in non-fluid condition comprising a sieve cylinder, means for delivering a mass consisting of curd and whey in metered quantities to the sieve cylinder, a plunger working in the sieve cylinder to compress the mass while the whey flows off from the sieve cylinder, said sieve cylinder having a lower open end, means closing off said end as the mass is being compressed, a cheese mold registerable with the lower end and receiving the compressed curd when said last-named means is removed to expose said lower end of the sieve cylinder with the compressed curd being forced into the cheese mold by the plunger.

2. Apparatus as claimed in claim 1, wherein said sieve cylinder has an open upper end and said means for delivering the mass consisting of curd and whey in metered quantities to the sieve cylinder includes a horizontal delivery cylinder having a double plunger reciprocably mounted therein, said delivery cylinder having an upper side formed with an inlet opening and a lower side formed with an outlet opening spaced axially of the delivery cylinder from the inlet opening and adapted to communicate with the open upper end of the sieve cylinder.

3. Apparatus as claimed in claim 2, wherein a plurality of sieve cylinders is provided, a rotatable turnstile supporting the sieve cylinders in a circumferentially spaced arrangement for successive movement under the outlet opening in the delivery cylinder, said means closing off the lower end of each sieve cylinder including a stationary slideway underlying the sieve cylinder and having an outlet opening, a turntable in which a plurality of cheese molds are disposed in a circumferentially spaced arrangement with the turntable successively moving the molds under the outlet opening in the slideway.

4. Apparatus as claimed in claim 1, in which the means for delivering the mass in metered quantities to the sieve cylinder includes the compressing plunger, which functions as a metering plunger, with the sieve cylinder being filled with the mass through its open lower end against light pressure of the plunger, the mass forcing the plunger upwards, means responsive to a predetermined stroke of the plunger for automatically shutting off the lower end of the cylinder, the plunger being subsequently pushed down with sufficient force to pre-compress the mass in the sieve cylinder with the cheese mold being placed underneath the sieve cylinder and the lower end of the cylinder being opened and the plunger finally pressing the precompressed mass into the cheese mold.

5. Apparatus for automatically filling cheese molds with metered quantities of curd in non-fluid condition, comprising at least one vertical sieve cylinder having an open lower end, a metering and compressing plunger working in the sieve cylinder, a mechanism for exerting a controlled upward and downward force on the plunger, a slideway movable relative to the sieve cylinder past the lower end of the sieve cylinder, the slideway being provided with an inlet opening which can be brought into register with a lower end of the sieve cylinder, a valve for closing the inlet opening, a conduit connected to the inlet opening of the slideway for delivering a mass consisting of curd and whey into the sieve cylinder when the valve is open, the slideway also being provided with an outlet opening which can be brought into register with the lower end of the sieve cylinder, means for placing a cheese mold under the outlet opening of the slideway and a mechanism for automatically closing the valve in the inlet opening of the slideway when the plunger reaches a pre-determined upper position.

6. Apparatus according to claim 5 in which the valve for closing the inlet opening of the slideway consists of a truncated cone shaped disc, having an upper face which is flush with the top of the slideway in the closed position of the valve and an actuating rod connected to the lower face of the disc.

7. Apparatus according to claim 5, in which a plurality of sieve cylinders are arranged on the slideway, each sieve cylinder being provided with its own metering and compressing plunger, the arrangement being such that the respective units of sieve cylinder and corresponding plunger may be intermittently moved in a circular path over the slideway from the inlet opening to the outlet opening thereof during the pre-compression of the curd.

References Cited in the file of this patent
UNITED STATES PATENTS

| | | |
|---|---|---|
| 1,130,635 | Roushar | Mar. 2, 1915 |
| 2,422,895 | Habericht | June 24, 1947 |
| 2,451,301 | O'Connell | Oct. 12, 1948 |
| 2,796,351 | Walter et al. | June 18, 1957 |
| 2,974,045 | Berge | Mar. 7, 1961 |